United States Patent
Broyde et al.

(10) Patent No.: US 7,983,645 B2
(45) Date of Patent: Jul. 19, 2011

(54) METHOD AND DEVICE FOR RADIO RECEPTION USING A PLURALITY OF ANTENNAS

(75) Inventors: Frédéric Broyde, Maule (FR); Evelyne Clavelier, Maule (FR)

(73) Assignee: Excem SAS, Maule (FR)

( * ) Notice: Subject to any disclaimer, the term of this patent is extended or adjusted under 35 U.S.C. 154(b) by 495 days.

(21) Appl. No.: 12/301,952

(22) PCT Filed: Jun. 5, 2007

(86) PCT No.: PCT/IB2007/001589
§ 371 (c)(1),
(2), (4) Date: Nov. 21, 2008

(87) PCT Pub. No.: WO2008/010035
PCT Pub. Date: Jan. 24, 2008

(65) Prior Publication Data
US 2010/0248673 A1    Sep. 30, 2010

(30) Foreign Application Priority Data
Jul. 18, 2006 (FR) ..................... 06 06502

(51) Int. Cl.
*H04B 1/06* (2006.01)
(52) U.S. Cl. ..................... 455/273; 455/276.1
(58) Field of Classification Search ........... None
See application file for complete search history.

(56) References Cited

U.S. PATENT DOCUMENTS

| | | | | |
|---|---|---|---|---|
| 5,021,801 A * | 6/1991 | Smith et al. | ............ | 343/876 |
| 5,055,798 A | 10/1991 | Heinzelmann | | |
| 5,557,603 A * | 9/1996 | Barlett et al. | ............ | 370/228 |
| 5,638,024 A * | 6/1997 | Dent et al. | ............ | 330/84 |
| 5,675,285 A * | 10/1997 | Winters | ............ | 330/124 R |
| 5,783,969 A * | 7/1998 | Luz | ............ | 330/124 R |
| 6,654,618 B2 * | 11/2003 | Kobayakawa | ............ | 455/562.1 |
| 2005/0141631 A1 | 6/2005 | Takano | | |
| 2009/0124230 A1 * | 5/2009 | Taipale | ............ | 455/341 |

FOREIGN PATENT DOCUMENTS

EP    0 957 532    11/1999

OTHER PUBLICATIONS

International Search Report for International Application No. PCT/IB2007/001589, dated Oct. 8, 2007.

* cited by examiner

*Primary Examiner* — Tuan Lam
(74) *Attorney, Agent, or Firm* — Christine H. McCarthy; Barnes & Thornburg LLP

(57) ABSTRACT

The invention relates to a method for radio reception using a plurality of antennas and to a receiver for radio transmission using a plurality of antennas. In a receiver for radio transmission with multiple antennas of the invention, 3 antennas are connected to the input ports of a device for transmission which transmits the electrical signals stemming from the 3 antennas to the input terminals of a multiple-input-port and multiple-output-port amplifier having 3 input ports and 3 output ports. Each output port of the multiple-input-port and multiple-output-port amplifier is connected to the input of an analog processing and conversion circuit which outputs digital signals. The output of each analog processing and conversion circuit is connected to an input of a multiple-input signal processing device, whose output is connected to the destination.

20 Claims, 6 Drawing Sheets

METHOD AND DEVICE FOR RADIO RECEPTION USING A PLURALITY OF ANTENNAS

CROSS-REFERENCE TO RELATED APPLICATIONS

The present application claims the benefit of priority to International Patent Application No. PCT/IB2007/001589 filed Jun. 5, 2007, which further claims the benefit of priority to France Patent Application No. 0606502 filed Jul. 18, 2006, the contents of which are hereby incorporated by reference in their entirety.

FIELD OF THE INVENTION

The invention relates to a method for radio reception using a plurality of antennas and to a receiver for radio transmission using a plurality of antennas. The received radio signals may carry information of any nature, for instance signals for speech transmission and/or image transmission (television) and/or data transmission. The received radio signals may be used for all types of transmission, for instance broadcasting, bidirectional point-to-point radio communication or radio communication in a cellular network.

The French patent application number 06/06502 of 18 Jul. 2006, entitled "Procédé et dispositif pour la réception radio-électrique utilisant une pluralité d'antennes" is incorporated by reference.

PRIOR ART

FIG. 1 shows an example of block diagram of a modern receiver for radio transmission using a single antenna. The antenna (100) is connected to the input of a bandpass filter (200). The output of the bandpass filter (200) is connected to the input of a low-noise amplifier (300). The output of the low-noise amplifier (300) is connected to the input of an analog processing and conversion circuit (400) which outputs digital signals. The output of the analog processing and conversion circuit (400) is connected to the input of a signal processing device (500), whose output is connected to the destination (600). For instance, in the case of a superheterodyne receiver, the analog processing and conversion circuit (400) may implement the following main steps: frequency conversion, filtering and amplification of the intermediate frequency signal, demodulation and analog-to-digital conversion of the I and Q signals. For example, the signal processing device (500) may implement the following main steps: deinterleaving, channel decoding, source decoding.

FIG. 2 shows an example of block diagram of a modern receiver for radio transmission using a plurality of antennas. Each of the 3 antennas (100) is connected to the input of a bandpass filter (200). The output of each bandpass filter (200) is connected to the input of a low-noise amplifier (300). The output of each low-noise amplifier (300) is connected to the input of an analog processing and conversion circuit (400) which outputs digital signals. The output of each analog processing and conversion circuit (400) is connected to an input of a multiple-input signal processing device (550), whose output is connected to the destination (600). Each analog processing and conversion circuit (400) may for instance be identical to an analog processing and conversion circuit usable in the block diagram of FIG. 1. For example, the multiple-input signal processing device (550) may implement the following main steps: OFDM demodulation of each input signal, space-time decoding, channel decoding, source decoding. In the case where the receiver of FIG. 2 is used with transmitters using also a plurality of antennas, the space-time decoding step is sometimes called MIMO decoding.

In the modern receiver for radio transmission using a plurality of antennas shown in FIG. 2, we note that the electrical circuits of the bandpass filters (200), of the low-noise amplifiers (300) and of the analog processing and conversion circuits (400) make up as many independent analog channels as there are antennas.

The impedance matrix $Z_{ANT}$ of an antenna array is non-diagonal when the interactions between the antennas are non-negligible, the absolute values of the non-diagonal components of the impedance matrix being generally larger when the antennas are placed closer to each other. The article of C. A. Desoer entitled "The Maximum Power Transfer Theorem for n-Ports", published in the journal *IEEE Transactions on Circuit Theory*, vol. 20, No. 3, pages 328 to 330, in May 1973, indicates that an antenna array used for receiving radio signals delivers a maximum power when it is connected to a load presenting an impedance matrix equal to $Z_{ANT}^*$, $Z_{ANT}^*$ being the hermitian adjoint of $Z_{ANT}$, that is to say a matrix equal to the matrix transpose of the matrix complex conjugate of $Z_{ANT}$. We will say that, in this case, maximum power transfer occurs.

The article of R. A. Speciale entitled "Advanced Design of Phased-Array Beam-Forming Networks", published in the journal *IEEE Antennas & Propagation Magazine*, vol. 38, No. 4, pages 22 to 34, in August 1996, and the article of J. W. Wallace and M. A. Jensen entitled "Termination-Dependent Diversity Performance of Coupled Antennas: Network Theory Analysis", published in the journal *IEEE Transactions on Antennas and Propagation*, vol. 52, No. 1, pages 98 to 105, in January 2004, show that radio reception using several antennas may be improved if one uses a lossless but not-necessarily-reciprocal multiple-input and multiple-output passive linear matching network, having its input terminals connected to the n coupled antennas and its output terminals connected to the m uncoupled loads, provided the multiple-input and multiple-output passive linear matching network has appropriate characteristics. The article of J. W. Wallace and M. A. Jensen investigates the effect of a lossless multiple-input and multiple-output passive linear network producing maximum power transfer. FIG. 3 shows an example of block diagram of a receiver for radio transmission using a plurality of antennas and such a multiple-input and multiple-output passive linear matching network. The antennas (100) are connected to the input terminals of the multiple-input and multiple-output passive linear matching network (250) which for instance produces maximum power transfer. The output terminals of the multiple-input and multiple-output passive linear matching network (250) are connected to the inputs of single-input and single-output low-noise amplifiers (300). The analog processing and conversion circuits (400) and the multiple-input signal processing device (550) are used as in FIG. 2.

Unfortunately, the specialists do not know a general procedure for designing a multiple-input and multiple-output passive linear matching network having arbitrary characteristics. Such a passive linear matching network is not used in practice, as mentioned in paragraph 5.3.1 of the book of W. C. Jakes entitled *Microwave Mobile Communications*, published by Wiley-Interscience in 1994. Consequently, we may say that the multiple-input and multiple-output passive linear matching network (250) is hypothetical, and that it is also likely that, in the cases where a design would be possible, this design might be complex and might produce non-negligible losses.

SUMMARY OF THE INVENTION

The purpose of the invention is a method for radio reception using a plurality of antennas and a receiver for radio transmission using a plurality of antennas without the limitations of known techniques.

The method of the invention for radio reception with multiple antennas using N antennas, where N is an integer greater than or equal to 2, comprises the steps of:
 converting electromagnetic signals to electrical signals using the N antennas;
 transmitting said electrical signals from the N antennas to the input terminals of one or more multiple-input-port and multiple-output-port amplifiers, through one or more devices for transmission, each of said devices for transmission behaving as a passive linear circuit, each of said multiple-input-port and multiple-output-port amplifiers having at least two input ports and at least two output ports, each of said input ports of each of said multiple-input-port and multiple-output-port amplifiers receiving the electrical signals from a different antenna among said N antennas;
 amplifying using said multiple-input-port and multiple-output-port amplifiers, each of said multiple-input-port and multiple-output-port amplifiers presenting, in a known frequency band, a loaded input admittance matrix approximating a wanted admittance matrix, said wanted admittance matrix being a non-diagonal and invertible square matrix;
 processing the signals delivered by said multiple-input-port and multiple-output-port amplifiers.

Let us consider one of said multiple-input-port and multiple-output-port amplifiers, comprising n input ports and m output ports, n and m being integers greater than or equal to 2. Let us number the input ports from 1 to n. Any integer j greater than or equal to 1 and less than or equal to n corresponds to the number of an input port of the amplifier. Let us define the input current $i_{Ij}$ into the positive terminal of the port j and the input voltage $v_{Ij}$ between the positive terminal of the port j and the negative terminal of the port j. We also define the column-vector $I_I$ of the input currents $i_{I1}, \ldots, i_{In}$, and the column-vector $V_I$ of the input voltages $v_{I1}, \ldots, v_{In}$. Let us number the output ports of the amplifier from 1 to m. Any integer k greater than or equal to 1 and less than or equal to m corresponds to the number of an output port of the amplifier. Let us define the output current $i_{Ok}$ flowing into the positive terminal of the port k and the output voltage $v_{Ok}$ between the positive terminal of the port k and the negative terminal of the port k. We also define the column-vector $I_O$ of the output currents $i_{O1}, \ldots, i_{Om}$, and the column-vector $V_O$ of the output voltages $v_{O1}, \ldots, v_{Om}$. If we assume that the multiple-input-port and multiple-output-port amplifier is linear, it is characterized, in frequency domain, by the two following equations:

$$I_I = Y_I V_I + Y_R V_O \quad (1)$$

$$I_O = Y_T V_I + Y_O V_O \quad (2)$$

where $Y_I$ is a square n×n matrix, where $Y_O$ is a square m×m matrix, where $Y_R$ is an n×m matrix and where $Y_T$ is a m×n matrix. All components of these matrices have the dimensions of admittance. Consequently, specialists understand that they can refer to $Y_I$ as the "input admittance matrix" of the amplifier, to $Y_R$ as the "reverse transfer admittance matrix" of the amplifier, to $Y_T$ as the "transfer admittance matrix" of the amplifier, and to $Y_O$ as the "output admittance matrix" of the amplifier. These four matrices have complex components and may be frequency-dependent.

In the case where an amplifier having n input ports and m output ports does not exactly comply with the equations (1) and (2), the specialists understand that these equations are nevertheless valid for small signals, at a given quiescent operating point, if the noise produced by the amplifier is neglected.

The specialist understands that, when the output ports of one of said multiple-input-port and multiple-output-port amplifiers are connected to a load presenting the impedance matrix $Z_L$, the input ports of the multiple-input-port and multiple-output-port amplifier present an admittance matrix $Y_{LI}$, which is referred to as the loaded input admittance matrix. The loaded input admittance matrix is given by:

$$Y_{LI} = Y_I - Y_R(1_m + Z_L Y_O)^{-1} Z_L Y_T = Y_I - Y_R Z_L(1_m + Y_O Z_L)^{-1} Y_T \quad (3)$$

where $1_m$ is the identity matrix of size m×m. In the special case $Z_L = 0_m$, where $0_m$ is the null matrix of size m×m, we have $Y_{LI} = Y_I$. Consequently, the input admittance matrix defined by equation (1) is a special case of the loaded input admittance matrix, for short-circuited output terminals.

At a given frequency f in said known frequency band, we shall use $Y_W$ to denote said wanted admittance matrix corresponding to one of said multiple-input-port and multiple-output-port amplifiers. According to the invention, $Y_W$ is a non-diagonal and invertible square matrix, and we require that $Y_{LI}$ approximates $Y_W$.

The designers of high-frequency circuits for radio applications usually use design tools, which may for instance help them to proportion a single-input and single-output amplifier.

A device for proportioning the circuits used in the method of the invention for radio reception with multiple antennas using N antennas, where N is an integer greater than or equal to 2, comprises:
 means for proportioning one or more devices for transmission used for transmitting the electrical signals from the N antennas to the input terminals of one or more multiple-input-port and multiple-output-port amplifiers, each of said devices for transmission behaving as a passive linear circuit, each of said multiple-input-port and multiple-output-port amplifiers having at least two input ports and at least two output ports, each of said input ports of each of said multiple-input-port and multiple-output-port amplifiers receiving the electrical signals from a different antenna among said N antennas;
 means for proportioning one or more said multiple-input-port and multiple-output-port amplifiers, each of said multiple-input-port and multiple-output-port amplifiers presenting, in a known frequency band, a loaded input admittance matrix approximating a wanted admittance matrix, said wanted admittance matrix being a non-diagonal and invertible square matrix.

A device for proportioning the circuits used in the method of the invention for radio reception with multiple antennas may comprise software and a computer.

The specialists understand that a device for proportioning the circuits used in the method of the invention for radio reception with multiple antennas may be able to take into account the characteristics of each of said antennas and the interactions between said antennas so as to determine the impedance matrix $Z_{ANT}$ of said antennas.

The specialist understands that the loaded input admittance matrix $Y_{LI}$ has an influence on the directivity of each antenna, hence on the ratios of each output voltage $v_{Ok}$ to the magnitude of the incident electric field of given polarization produced by a distant source, as a function of the direction of arrival. These ratios correspond to the directivity of each output voltage $v_{Ok}$. The specialist understands that the loaded input admittance matrix $Y_{LI}$ has an influence on the correlation coefficients between the signals delivered by the antennas, hence on the correlation coefficients between the output voltages $v_{Ok}$.

When the output terminals of a multiple-input-port and multiple-output-port amplifier are connected to a load presenting the impedance matrix $Z_L$, we have:

$$V_O = -(1_m + Z_L Y_O)^{-1} Z_L Y_T V_I = -Z_L (1_m + Y_O Z_L)^{-1} Y_T V_I \quad (4)$$

Consequently, we may define the voltage gain matrix $G_V$ of the multiple-input-port and multiple-output-port amplifier as:

$$G_V = -(1_n + Z_L Y_O)^{-1} Z_L Y_T = -Z_L (1_n + Y_O Z_L)^{-1} Y_T \quad (5)$$

The voltage gain matrix $G_V$ describes linear combinations between the input voltages. The specialist therefore understands that the voltage gain matrix $G_V$ has an influence on the ratios of each output voltage $v_{Ok}$ to the magnitude of the incident electric field of given polarization produced by a distant source, as a function of the direction of arrival, hence on the directivity of each output voltage $v_{Ok}$ and on the correlation coefficients between the output voltages $v_{Ok}$. The specialists understand that a device for proportioning the circuits used in the method of the invention for radio reception with multiple antennas may be able to compute the ratios of each output voltage $v_{Ok}$ to the magnitude of the incident electric field of given polarization produced by a distant source, as a function of the direction of arrival. Consequently, a device for proportioning the circuits used in the method of the invention may be such that the means for proportioning one or more said multiple-input-port and multiple-output-port amplifiers comprise means for determining the dependence of one or more of the output voltages $v_{Ok}$ of one or more said multiple-input-port and multiple-output-port amplifiers upon the direction of arrival of an electromagnetic wave.

A receiver for radio transmission with multiple antennas of the invention, using N antennas, where N is an integer greater than or equal to 2, comprises:
  one or more multiple-input-port and multiple-output-port amplifiers, each multiple-input-port and multiple-output-port amplifier having at least two input ports and at least two output ports, each multiple-input-port and multiple-output-port amplifier presenting, in a known frequency band, a loaded input admittance matrix approximating a wanted admittance matrix, said wanted admittance matrix being a non-diagonal and invertible square matrix;
  one or more devices for transmission, each device for transmission behaving as a passive linear circuit transmitting the electrical signals from at least one of said antennas to the input terminals of one or more of said multiple-input-port and multiple-output-port amplifiers, each of said input ports of each of said multiple-input-port and multiple-output-port amplifiers receiving the electrical signals from a different antenna among said N antennas;
  a signal processing assembly processing the signals delivered by said multiple-input-port and multiple-output-port amplifiers.

According to the invention, there may be several multiple-input-port and multiple-output-port amplifiers. These multiple-input-port and multiple-output-port amplifiers may have different characteristics from one another. Consequently, at a given frequency f in said known frequency band, said wanted admittance matrix $Y_W$ and the matrices $Y_I$, $Y_R$, $Y_T$ and $Y_O$ may be different for each said multiple-input-port and multiple-output-port amplifier.

According to the invention, one of said multiple-input-port and multiple-output-port amplifiers may for instance be such that the negative terminals of the input ports and/or of the output ports correspond to a "reference terminal", such ports being asymmetrical in this case.

According to the invention, at least one of said multiple-input-port and multiple-output-port amplifiers may for instance be such that each input port corresponds to a symmetrical input and/or such that each output port corresponds to a symmetrical output.

According to the invention, at least one of said devices for transmission may for instance comprise 2-conductor interconnections (that is to say 2-conductor transmission lines), each 2-conductor interconnection linking one of said N antennas to an input port of one of said multiple-input-port and multiple-output-port amplifiers. Such a 2-conductor interconnection may for instance be made up of a coaxial cable, or of printed circuit board traces, for instance using the stripline or the microstrip structures. According to the invention, at least one of said devices for transmission may for instance comprise waveguides, each waveguide connecting one of said antennas to an input port of one of said multiple-input-port and multiple-output-port amplifiers.

According to the invention, at least one of said devices for transmission may for instance comprise coaxial cables and an equal number of transformers, each transformer being designed to couple a balanced antenna to an unbalanced interconnection (balun), the balanced port of each transformer being connected to a balanced antenna among said N antennas, the unbalanced port of each transformer being connected to an end of one of the coaxial cables, the other end of each coaxial cable being connected to an input port of one of said multiple-input-port and multiple-output-port amplifiers.

According to the invention, at least one of said devices for transmission may also for instance comprise electrical filters, each electrical filter having one input port and one output port. For instance, such filters may be bandpass filters, comprising one or more capacitors, one or more windings, such windings being possibly coupled by mutual induction. According to the invention, such filters may also for instance be electromagnetic cavity filters or surface acoustic wave filters.

According to the invention, at least one of said devices for transmission may also for instance comprise phase-shifters. According to the invention, at least one of said devices for transmission may also for instance comprise non-reciprocal transmission devices, for instance isolators.

According to the invention, at least one of said devices for transmission may also comprise switching means, for instance when the receiver for radio transmission with multiple antennas of the invention is combined with a radio transmitter using the same antennas. Such switching means are well known to specialists.

According to the invention, at least one of said multiple-input-port and multiple-output-port amplifiers may comprise a multiple-input and multiple-output series-series feedback amplifier. Such multiple input and multiple-output series-series feedback amplifiers (MIMO-SSFA) are for instance described in the French patent application no. 06/00388 of 17 Jan. 2006 entitled "Amplificateur à entrées multiples et sorties multiples", in the corresponding international application no. PCT/IB2006/003950 of 19 Dec. 2006 entitled "Multiple-input and multiple-output amplifier", in the French patent application no. 06/05633 of 23 Jun. 2006 entitled "Amplificateur à entrées multiples et sorties multiples utilisant l'induction mutuelle dans le réseau de rétroaction" and in the corresponding international application no. PCT/IB2007/001344 of 26 Apr. 2007 entitled "Multiple-input and multiple-output amplifier using mutual induction in the feedback network".

The specialist understands that a multiple-input and multiple-output series-series feedback amplifier may provide an arbitrary loaded input admittance matrix $Y_{LI}$. Consequently, the wanted admittance matrix $Y_W$ may be arbitrary. The feedback network of a multiple-input and multiple-output series-series feedback amplifier being possibly such that its impedance matrix can be adjusted, for instance by electrical means, the specialist understands that one or more of said multiple-input-port and multiple-output-port amplifiers may be such that its loaded input admittance matrix $Y_{LI}$ may be adjusted, for instance by electrical means.

The specialist understands that it is also possible to proportion said multiple-input-port and multiple-output-port amplifiers such that the voltage gain matrix $G_V$ of each of said multiple-input-port and multiple-output-port amplifiers approximates a specified gain matrix $G_S$.

The specialist understands that a receiver for radio transmission with multiple antennas of the invention may be designed to provide the same advantages as those provided by an above-mentioned hypothetical multiple-input and multiple-output passive linear matching network, for instance a maximum power transfer.

According to the invention, said multiple-input-port and multiple-output-port amplifiers may preferably be proportioned such that they produce a reduced noise spectral density. The noise level at the output of a single-input and single-output amplifier depends on the internal impedance of the generator connected to the input of the amplifier, and the maximum signal-to-noise ratio at the output does not necessarily correspond to the maximum power transfer between this generator and the input of the amplifier. In the same way, the noise level at the output ports of a multiple-input-port and multiple-output-port amplifier depends on the internal impedance matrix of the multiple-port generator connected to the input ports of the multiple-input-port and multiple-output-port amplifier, and the maximum signal-to-noise ratio at the output ports does not necessarily correspond to the maximum power transfer between this multiple-port generator and the input ports of the multiple-input-port and multiple-output-port amplifier. The specialists understand how the many known methods for designing low-noise single-input and single-output amplifiers may be generalized to design low-noise multiple-input-port and multiple-output-port amplifiers.

BRIEF DESCRIPTION OF THE DRAWINGS

Other advantages and characteristics will appear more clearly from the following description of particular embodiments of the invention, given by way of non-limiting examples, with reference to the accompanying drawings in which.

DETAILED DESCRIPTION OF SOME EMBODIMENTS

First Embodiment

Figure 1:
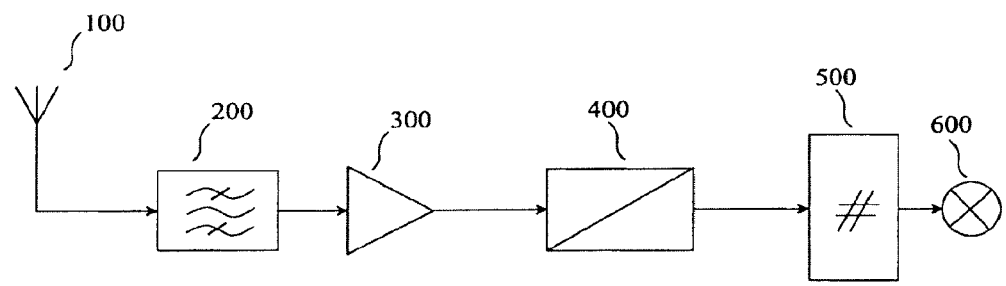
FIG. 1 shows a receiver for radio transmission using a single antenna and has already been discussed in the section dedicated to the presentation of prior art.
Figure 2:
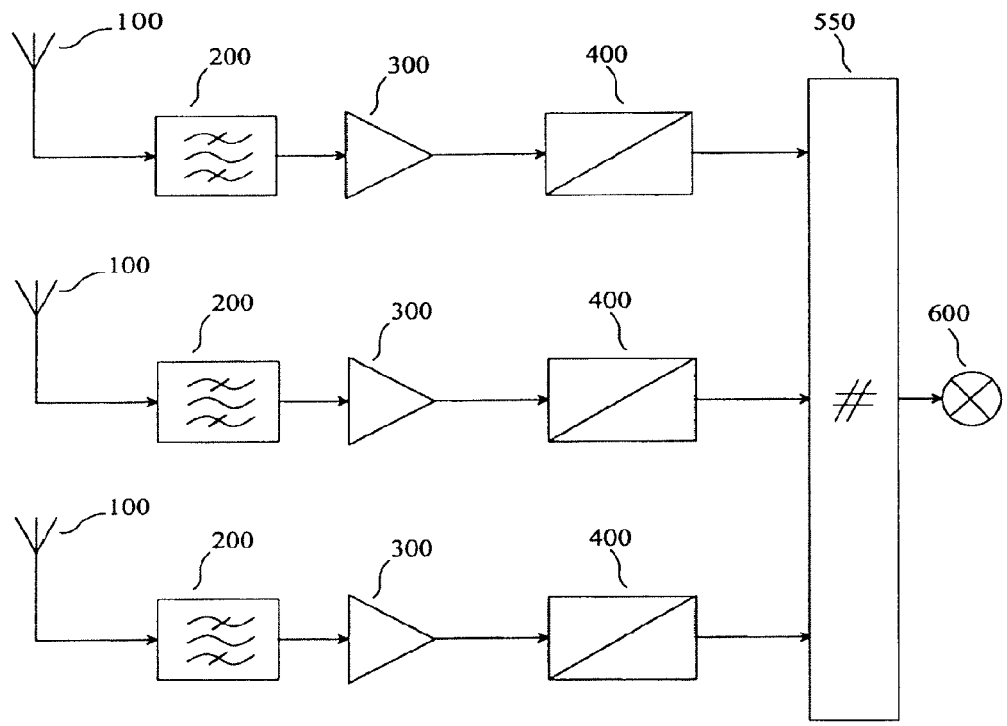
FIG. 2 shows a receiver for radio transmission using several antennas, comprising as many independent analog channels as there are antennas, and has already been discussed in the section dedicated to the presentation of prior art.
Figure 3:
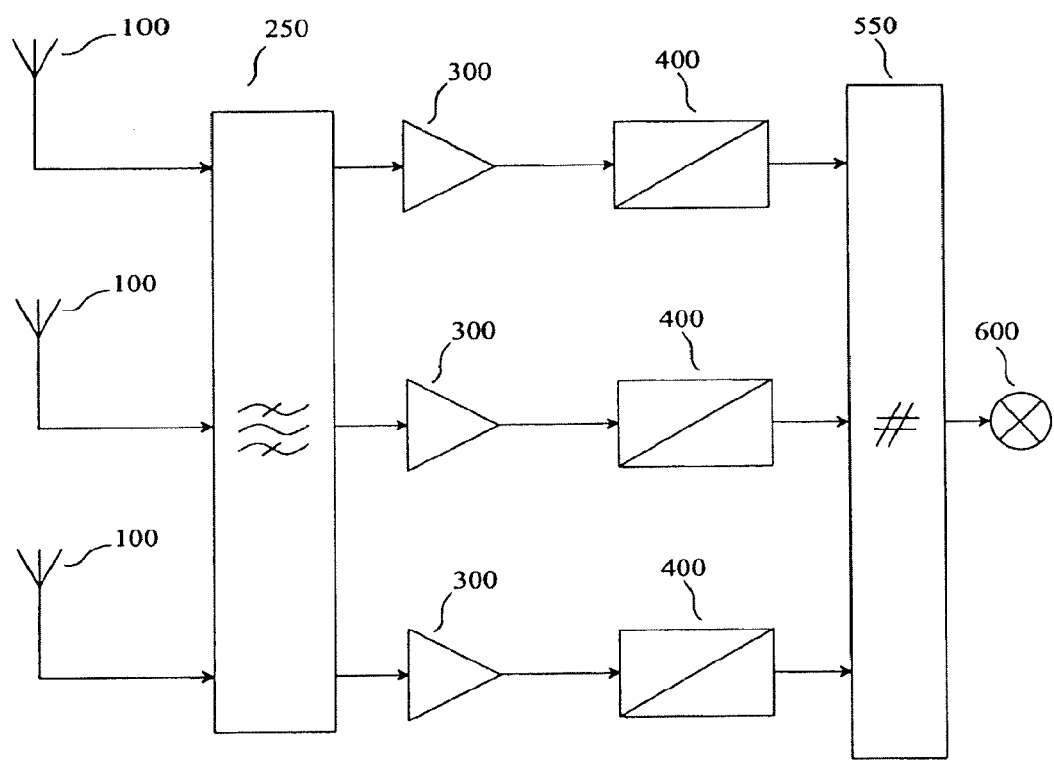
FIG. 3 shows a receiver for radio transmission using several antennas, comprising a multiple-input and multiple-output passive linear matching network, and has already been discussed in the section dedicated to the presentation of prior art.
Figure 4:
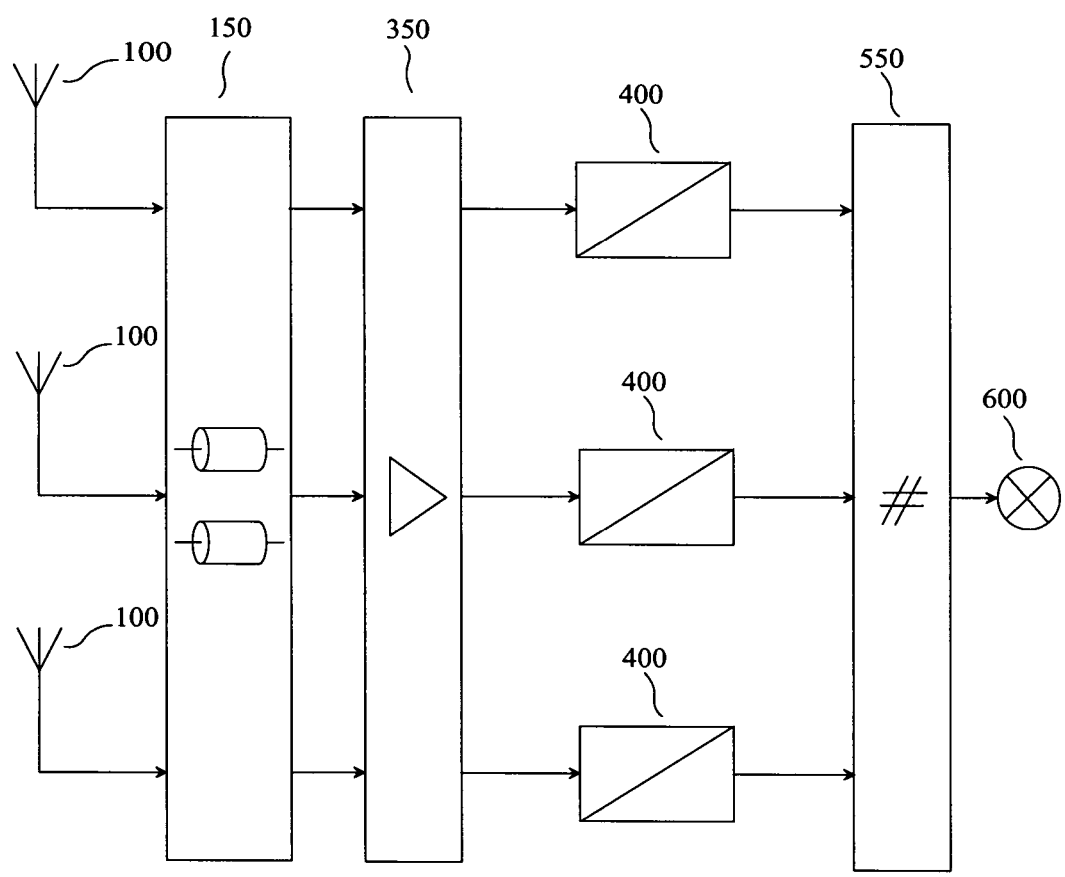
FIG. 4 shows a receiver for radio transmission with multiple antennas of the invention.

As a first embodiment of a device of the invention, given by way of non-limiting example, we have represented in FIG. 4 the block diagram of a receiver for radio transmission with multiple antennas of the invention. The 3 antennas (100) are connected to the input ports of a device for transmission (150) behaving as a passive linear circuit. The device for transmission (150) transmits the electrical signals stemming from each of the 3 antennas to the input terminals of a multiple-input-port and multiple-output-port amplifier (350) having 3 input ports and 3 output ports, each input port receiving the electrical signals from a different antenna. Each output port of the multiple-input-port and multiple-output-port amplifier (350) is connected to the input of an analog processing and conversion circuit (400) which outputs digital signals. The output of each analog processing and conversion circuit (400) is connected to an input of a multiple-input signal processing device (550), whose output is connected to the destination (600). The 3 analog processing and conversion circuits (400) and the multiple-input signal processing device (550) make up a signal processing assembly processing the signals delivered by the multiple-input-port and multiple-output-port amplifier (350). We note that N may be greater than or equal to three.

In this first embodiment, the multiple-input-port and multiple-output-port amplifier (350) has a narrow passband and is designed to produce the lowest possible noise spectral density at its output ports, in the frequency band of operation. The admittance matrix $Y_{SA}$ seen by the antennas is the admittance matrix of the input ports of the device for transmission (150). The specialists know how to establish the relationship between the admittance matrix $Y_{SA}$ seen by the antennas and the loaded input admittance matrix $Y_{LI}$, taking into account that losses are low in the device for transmission (150). The specialists therefore understand that the multiple-input-port and multiple-output-port amplifier (350) may be designed to perform the following functions:

bandpass filtering;

amplifying signals, with a reduced contribution to the noise level at the output;

presenting a non-diagonal loaded input admittance matrix $Y_{LI}$ providing a desired influence on the directivity of the signal delivered by each antenna and on the correlation coefficients between the signals delivered by the antennas;

presenting a non-diagonal voltage gain matrix $G_V$ providing a desired influence on the directivity of each output voltage $v_{Ok}$ and on the correlation coefficients between the output voltages $v_{Ok}$.

Second Embodiment

Best Mode

Figure 5:
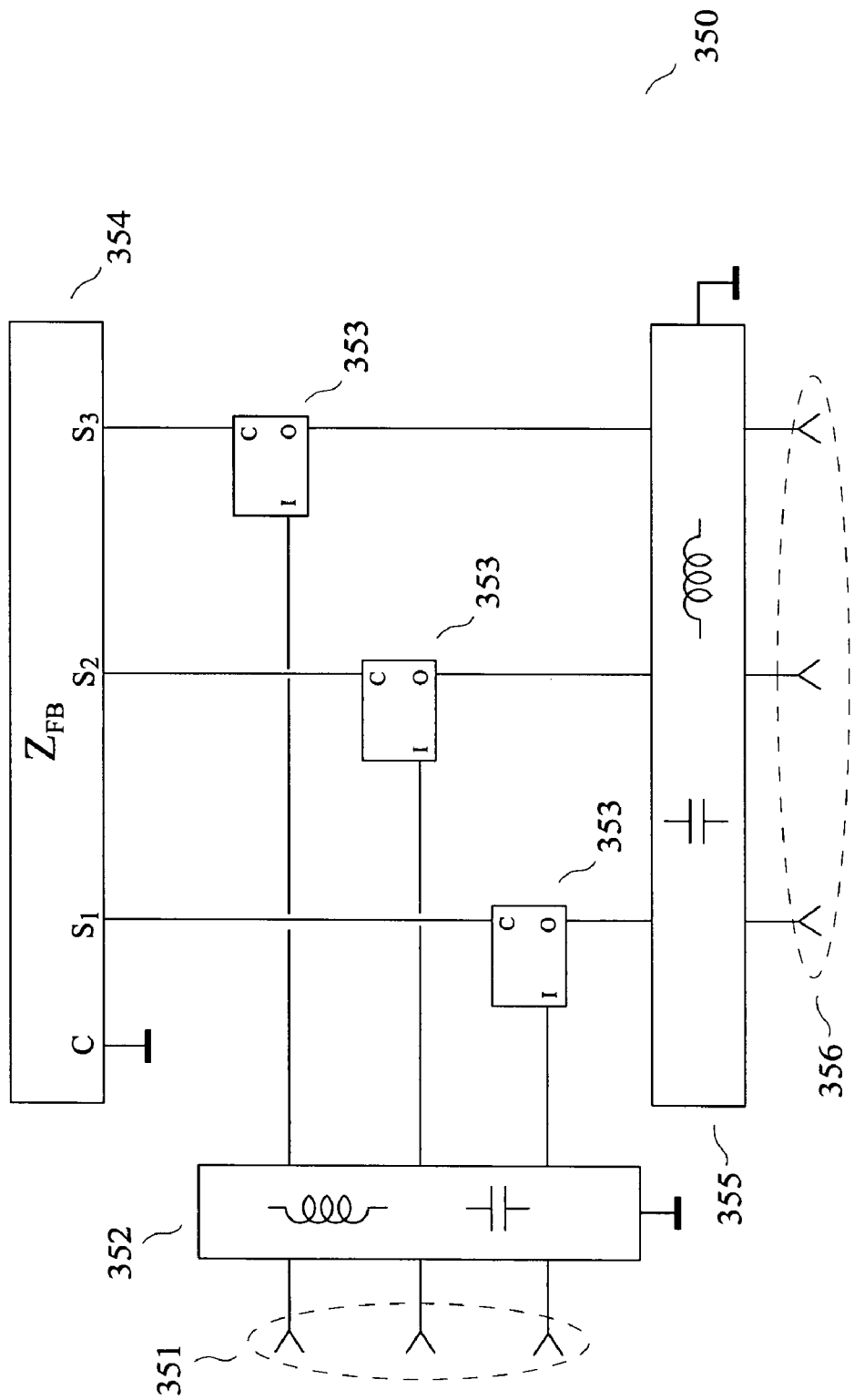
FIG. 5 shows the block diagram of a multiple-input-port and multiple-output-port amplifier which may be used in the receiver for radio transmission with multiple antennas shown in FIG. 4.

The second embodiment of a device of the invention, given by way of non-limiting example and best mode of carrying out the invention, also corresponds to the receiver for radio transmission with multiple antennas of the invention represented in FIG. 4, and all explanations provided for the first embodiment are applicable to this second embodiment. Additionally, in this second embodiment, the multiple-input-port and multiple-output-port amplifier (350) corresponds to the block diagram of FIG. 5.

Let us call "signal input terminal" an input terminal other than the reference terminal. Let us call "signal output terminal" an output terminal other than the reference terminal. The multiple-input-port and multiple-output-port amplifier (350) shown in FIG. 5 comprises 3 signal input terminals (351), a passive input network (352), 3 active sub-circuits (353), a feedback network (354), a passive output network (355) and 3 signal output terminals (356). Each of the three input ports is made of one of the 3 signal input terminals (351) and of the reference terminal represented as the ground symbol in FIG. 5, each signal input terminal being connected to an input terminal of the passive input network (352). Each of the three output ports is made of one of the 3 signal output terminals (356) and of the reference terminal, each signal output terminal being connected to an output terminal of the passive output network (355).

The 3 active sub-circuits (353) and the feedback network (354) make up a multiple-input and multiple-output series-series feedback amplifier described in said French patent application no. 06/00388 and international application no. PCT/IB2006/003950, the p signal input terminals of the multiple-input and multiple-output series-series feedback amplifier being connected to the p signal output terminals of the passive input network having p input ports, and the p signal output terminals of the multiple-input and multiple-output series-series feedback amplifier being connected to the p signal input terminals of the passive output network having p output ports (in this second embodiment, we have p=3 and p=N, but other values are obviously possible for the positive integer p). Each active sub-circuit (353) has a sub-circuit input terminal connected to one of the signal output terminals of the passive input network (352), a sub-circuit output terminal connected to one of the signal input terminals of the passive output network (355) and a sub-circuit common terminal. Each active sub-circuit (353) is such that the current flowing out of the sub-circuit common terminal and the current flowing into the sub-circuit output terminal depend on the voltage between the sub-circuit input terminal and the sub-circuit common terminal. The feedback network (354) has a terminal connected to the reference terminal represented as the ground symbol in FIG. 5. The feedback network (354) also has 3 other terminals, each being connected to the sub-circuit common terminal of a different active sub-circuit (353). The feedback network presents, in the known frequency band, an impedance matrix $Z_{FB}$, said impedance matrix being defined with respect to said reference terminal, the feedback network producing a negative feedback such that, in the known frequency band:

- the loaded input admittance matrix $Y_{LI}$ of the multiple-input-port and multiple-output-port amplifier (350) approximates a wanted admittance matrix $Y_W$;
- the voltage gain matrix $G_V$ of the multiple-input-port and multiple-output-port amplifier (350) approximates a specified gain matrix $G_S$;
- the noise level at the output ports is as low as possible.

Third Embodiment

Figure 6:
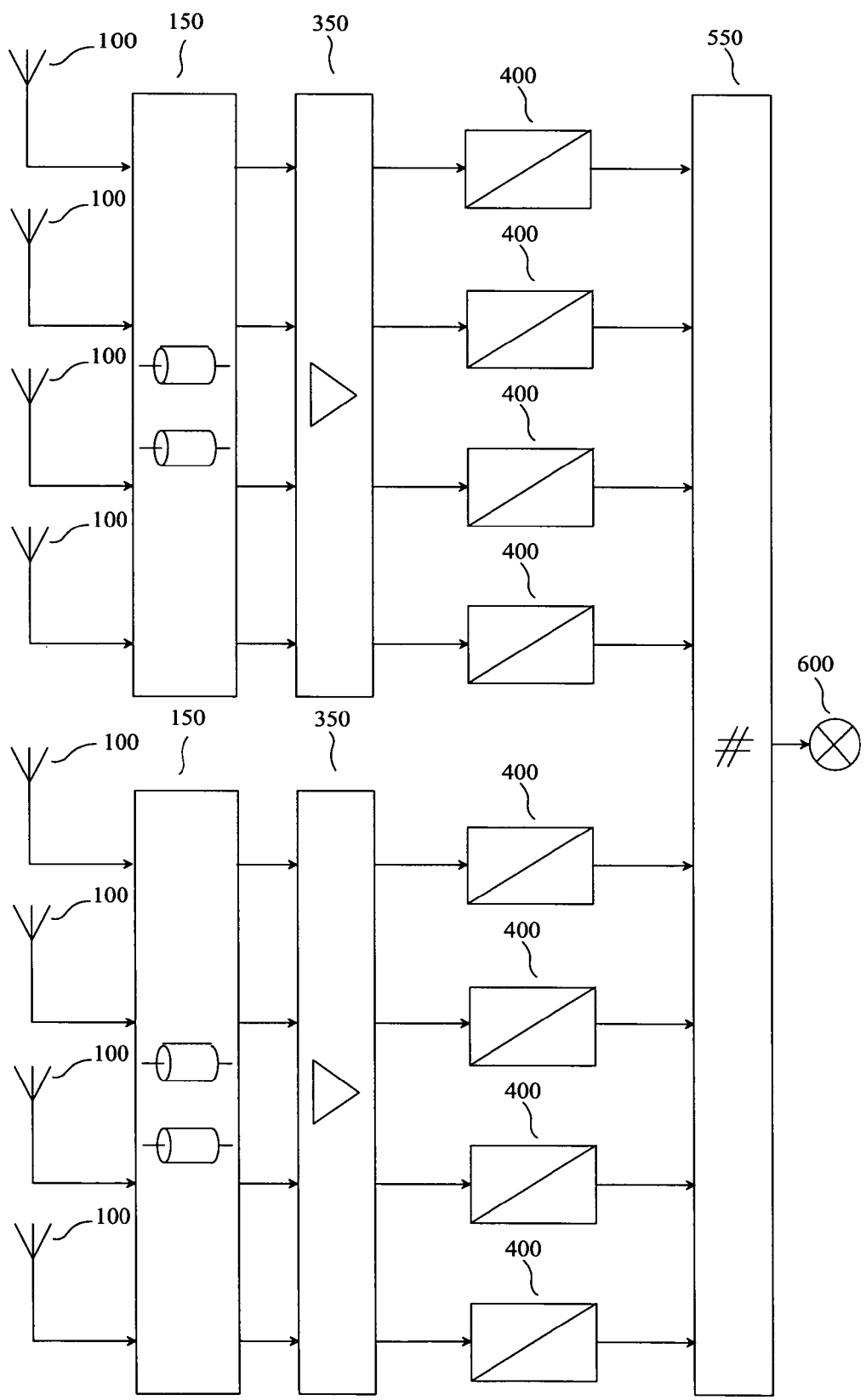
FIG. 6 shows a receiver for radio transmission with multiple antennas of the invention.

As a third embodiment of a device of the invention, given by way of non-limiting example, we have represented in FIG. 6 the block diagram of a receiver for radio transmission with multiple antennas of the invention, comprising 8 antennas (100), 2 devices for transmission (150), 2 multiple-input-port and multiple-output-port amplifiers (350), 8 analog processing and conversion circuits (400) and a multiple-input signal processing device (550), whose output is connected to the destination (600). The 8 antennas (100) make up 2 arrays of antennas, each array of antennas comprising 4 antennas (100), the interactions being negligible between two antennas belonging to different arrays of antennas. The 4 antennas (100) of each array of antennas are connected to the input ports of only one of the two devices for transmission (150), which behaves as a passive linear circuit transmitting the electrical signals stemming from the 4 antennas (100) to the input terminals of only one of the two multiple-input-port and multiple-output-port amplifiers (350). Each multiple-input-port and multiple-output-port amplifier (350) has 4 input ports and 4 output ports, each input port receiving the electrical signals from a different antenna. Each output port of each multiple-input-port and multiple-output-port amplifier (350) is connected to the input of an analog processing and conversion circuit (400) which outputs digital signals. The output of each analog processing and conversion circuit (400) is connected to an input of a multiple-input signal processing device (550), whose output is connected to the destination (600). The 8 analog processing and conversion circuits (400) and the multiple-input signal processing device (550) make up a signal processing assembly processing the signals delivered by the two multiple-input-port and multiple-output-port amplifiers (350).

In this third embodiment, the receiver for radio transmission with multiple antennas of the invention is for instance intended for receiving in the frequency band 1850 MHz to 1910 MHz, which is here the "known frequency band". Each array of antennas is for instance made of 4 identical and parallel (hence of the same polarization) antennas, these antennas being close to each other. At the center frequency of 1880 MHz, each array of antennas for instance presents an impedance matrix $Z_{ant}$ equal to:

$$Z_{ant} = \begin{pmatrix} 73,1 & 1,1-36,4j & -23,3-15,9j & 1,1-36,4j \\ 1,1-36,4j & 73,1 & 1,1-36,4j & -23,3-15,9j \\ -23,3-15,9j & 1,1-36,4j & 73,1 & 1,1-36,4j \\ 1,1-36,4j & -23,3-15,9j & 1,1-36,4j & 73,1 \end{pmatrix} \Omega \quad (6)$$

The specialists understand that the diagonal components of this matrix $Z_{ant}$ are the self impedances of the antennas of an array of antennas, that the non-diagonal components of this matrix $Z_{ant}$ are the mutual impedances between the antennas of the array of antennas and that $Z_{ant}$ is a sub-matrix of the impedance matrix $Z_{ANT}$ concerning the 8 antennas (100).

We have said that the arrays of antennas are such that interactions are negligible between two antennas belonging to different arrays of antennas. The specialists understand that this characteristic corresponds to negligible mutual impedances between two antennas belonging to different arrays of antennas, and that this characteristic may for instance be obtained by arranging the arrays of antennas at a sufficient distance from each other, or by using crossed polarizations in each array of antennas.

In this third embodiment, the devices for transmission (150) and the multiple-input-port and multiple-output-port amplifiers (350) may for instance be such that the inverse of the admittance matrix $Y_{SA}$ seen by each array of antennas approximates $Z_{ant}^*$, $Z_{ant}^*$ being the hermitian adjoint of $Z_{ant}$, so as to practically obtain the maximum power transfer in the known frequency band.

Fourth Embodiment

The fourth embodiment of a device of the invention, given by way of non-limiting example, also corresponds to the receiver for radio transmission with multiple antennas of the invention represented in FIG. 6, and all explanations provided for the third embodiment are applicable to this fourth embodiment. Additionally, in this fourth embodiment, each multiple-input-port and multiple-output-port amplifier corresponds to the simplified schematic diagram of FIG. 7.

Figure 7:
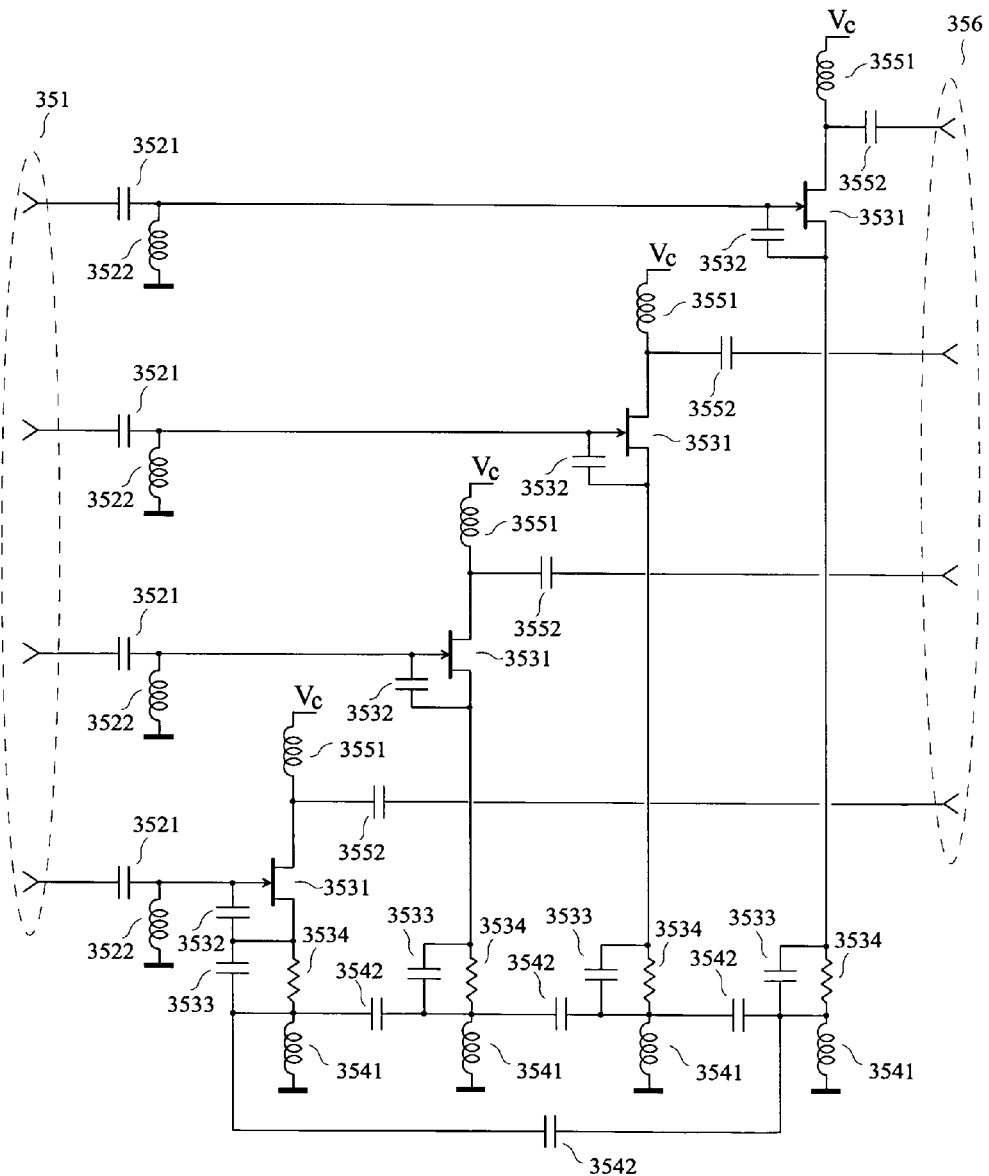
FIG. 7 shows the simplified schematic diagram of a multiple-input-port and multiple-output-port amplifier which may be used in the receiver for radio transmission with multiple antennas shown in FIG. 6.

The multiple-input-port and multiple-output-port amplifier shown in FIG. 7 comprises:
- 4 signal input terminals (351);
- a passive input network made of 4 capacitors (3521) and of 4 windings (3522);
- 4 active sub-circuits each made of a gallium arsenide field effect transistor (3531) of the PHEMT type, of two capacitors (3532) and (3533) and of a resistor (3534);
- a feedback network made of 4 windings (3541) and of 4 capacitors (3542);
- a passive output network made of 4 windings (3551) and 4 capacitors (3552);
- 4 signal output terminals (356).

Each of the four input ports is made of one of the 4 signal input terminals (351) and of the reference terminal represented as the ground symbol in FIG. 7, each signal input terminal being connected to an input terminal of the passive input network. Each of the four output ports is made of one of the 4 signal output terminals (356) and of the reference terminal, each signal output terminal being connected to an output terminal of the passive output network. Alternatively, it would have been possible to use symmetrical outputs, by implementing one of the methods well known to specialists.

The 4 windings of the feedback network are arranged in such a way that, in the known frequency band, the mutual induction between the different windings has a non-negligible influence on the value of the non-diagonal components of the impedance matrix $Z_{FB}$ of the feedback network, this impedance matrix being defined with respect to said reference terminal. The 4 active sub-circuits and the feedback network consequently make up a multiple-input and multiple-output series-series feedback amplifier described in said French patent application no. 06/05633 and international application no. PCT/IB2007/001344.

The specialists understand how they can proportion the components of the simplified schematic diagram of FIG. 7 in such a way that, in the known frequency band:

- the loaded input admittance matrix $Y_{LI}$ of the multiple-input-port and multiple-output-port amplifier provides an admittance matrix $Y_{SA}$ seen by each array of antennas such that $Y_{SA}$ approximates a desired admittance matrix $Y_{DA}$;
- the voltage gain matrix $G_V$ of the multiple-input-port and multiple-output-port amplifier approximates a specified gain matrix $G_S$;
- the noise level at the signal output terminals (356) is as small as possible, using the fact that an inductance connected in series with the source of each gallium arsenide field effect transistor (3531) may provide this result, as explained in the U.S. Pat. No. 4,614,915 entitled "Monolithic series feedback low noise amplifier", of 30 Sep. 1986.

The multiple-input-port and multiple-output-port amplifier shown in FIG. 7 may for instance be built using discrete components, or in an integrated circuit.

INDICATIONS ON INDUSTRIAL APPLICATIONS

The invention is suitable for radio reception using multiple antennas, for instance according to diversity reception methods, according to adaptive reception methods, or according to methods using space-time decoding, such as MIMO radio transmission methods.

The invention is suitable for reception of radio signals of any nature, for instance for the transmission of audio signals (voice) and/or video signals (for static and/or dynamic images) and/or data. The received radio signals may correspond to any type of transmission, for instance broadcasting, duplex point-to-point radio communications or radio communications in a cellular network.

In particular, the invention provides the best possible characteristics using very close antennas, hence presenting a strong interaction between the antennas. The invention is therefore particularly suitable for mobile reception devices, for instance those used in portable radiotelephones.

In particular, the invention provides the best possible characteristics using a very large number of antennas in a given volume, hence presenting a strong interaction between the antennas. The invention is therefore particularly suitable for high-performance reception devices, for instance those used in the fixed stations of cellular radiotelephony networks.

The invention claimed is:

1. A method for radio reception with multiple antennas using N antennas, where N is an integer greater than or equal to 2, the method comprising:
- converting electromagnetic signals to electrical signals using the N antennas;
- transmitting said electrical signals from the N antennas to the input terminals of one or more multiple-input-port and multiple-output-port amplifiers, through one or more transmission devices, each of said transmission devices behaving as a passive linear circuit, each of said multiple-input-port and multiple-output-port amplifiers having at least two input ports and at least two output ports, each of said input ports of each of said multiple-input-port and multiple-output-port amplifiers receiving the electrical signals from a different antenna among said N antennas;
- amplifying using said multiple-input-port and multiple-output-port amplifiers, each of said multiple-input-port and multiple-output-port amplifiers presenting, in a known frequency band, a loaded input admittance matrix approximating a wanted admittance matrix, said wanted admittance matrix being a non-diagonal and invertible square matrix; and processing the signals delivered by said multiple-input-port and multiple-output-port amplifiers.

2. The method of claim 1, wherein each of said multiple-input-port and multiple-output-port amplifiers comprises a feedback network producing a negative feedback such that each of said multiple-input-port and multiple-output-port amplifiers presents, in said known frequency band, a loaded input admittance matrix approximating said wanted admittance matrix.

3. The method of claim 1, wherein each of said multiple-input-port and multiple-output-port amplifiers comprises a feedback network producing a negative feedback such that each of said multiple-input-port and multiple-output-port amplifiers presents, in said known frequency band, a voltage gain matrix approximating a specified gain matrix.

4. A device for proportioning the circuits used in a method for radio reception with multiple antennas using N antennas, where N is an integer greater than or equal to 2, the device comprising:

means for proportioning one or more transmission devices used for transmitting electrical signals from the N antennas to the input terminals of one or more multiple-input-port and multiple-output-port amplifiers, each of said transmission devices behaving as a passive linear circuit, each of said multiple-input-port and multiple-output-port amplifiers having at least two input ports and at least two output ports, each of said input ports of each of said multiple-input-port and multiple-output-port amplifiers receiving the electrical signals from a different antenna among said N antennas; and means for proportioning one or more said multiple-input-port and multiple-output-port amplifiers presenting, in a known frequency band, a loaded input admittance matrix approximating a wanted admittance matrix, said wanted admittance matrix being a non-diagonal and invertible square matrix.

5. The device of claim 4, wherein each of said multiple-input-port and multiple-output-port amplifiers comprises a feedback network producing a negative feedback such that each of said multiple-input-port and multiple-output-port amplifiers presents, in said known frequency band, a loaded input admittance matrix approximating said wanted admittance matrix.

6. The device of claim 4, wherein the means for proportioning one or more of said multiple-input-port and multiple-output-port amplifiers comprise means for determining the dependence of one or more of the output voltages of one or more said multiple-input-port and multiple-output-port amplifiers upon the direction of arrival of an electromagnetic wave.

7. A receiver for radio transmission with multiple antennas, using N antennas, where N is an integer greater than or equal to 2, the receiver comprising:

one or more multiple-input-port and multiple-output-port amplifiers, each of said multiple-input-port and multiple-output-port amplifiers having at least two input ports and at least two output ports, each of said multiple-input-port and multiple-output-port amplifiers presenting, in a known frequency band, a loaded input admittance matrix approximating a wanted admittance matrix, said wanted admittance matrix being a non-diagonal and invertible square matrix;

one or more transmission devices, each transmission device behaving as a passive linear circuit transmitting the electrical signals from at least one of said antennas to the input terminals of one or more of said multiple-input-port and multiple-output-port amplifiers, each of said input ports of each of said multiple-input-port and multiple-output-port amplifiers receiving the electrical signals from a different antenna among said N antennas; and a signal processing assembly processing the signals delivered by said multiple-input-port and multiple-output-port amplifiers.

8. The receiver for radio transmission with multiple antennas of claim 7, wherein at least one of said transmission devices comprises 2-conductor interconnections, each 2-conductor interconnection linking one of said N antennas to an input port of one of said multiple-input-port and multiple-output-port amplifiers.

9. The receiver for radio transmission with multiple antennas of claim 7, wherein at least one of said multiple-input-port and multiple-output-port amplifiers comprises a multiple-input and multiple-output series-series feedback amplifier.

10. The receiver for radio transmission with multiple antennas of claim 7, wherein at least one of said multiple-input-port and multiple-output-port amplifiers comprises a multiple-input and multiple-output series-series feedback amplifier comprising a feedback network comprising a plurality of windings, the windings of the feedback network being such that, in the known frequency band, the mutual induction between the different windings has a non-negligible influence on the value of the non-diagonal components of the impedance matrix of the feedback network.

11. The receiver for radio transmission with multiple antennas of claim 7, wherein at least one of said multiple-input-port and multiple-output-port amplifiers comprises a multiple-input and multiple-output series-series feedback amplifier, the p signal input terminals of the multiple-input and multiple-output series-series feedback amplifier being connected to the p signal output terminals of a passive input network having p input ports, the p signal output terminals of the multiple-input and multiple-output series-series feedback amplifier being connected to the p signal input terminals of a passive output network having p output ports, p being a positive integer.

12. The receiver for radio transmission with multiple antennas of claim 7, wherein said multiple-input-port and multiple-output-port amplifiers are such that the voltage gain matrix of each of said multiple-input-port and multiple-output-port amplifiers approximates a specified gain matrix.

13. The receiver for radio transmission with multiple antennas of claim 7, wherein said multiple-input-port and multiple-output-port amplifiers produce a reduced noise spectral density.

14. The receiver for radio transmission with multiple antennas of claim 7, wherein each of said multiple-input-port and multiple-output-port amplifiers comprises a feedback network producing a negative feedback such that each of said multiple-input-port and multiple-output-port amplifiers presents, in said known frequency band, a loaded input admittance matrix approximating said wanted admittance matrix.

15. The receiver for radio transmission with multiple antennas of claim 14, wherein at least one of said transmission devices comprises 2-conductor interconnections, each 2-conductor interconnection linking one of said N antennas to an input port of one of said multiple-input-port and multiple-output-port amplifiers.

16. The receiver for radio transmission with multiple antennas of claim 14, wherein at least one of said multipleinput-port and multiple-output-port amplifiers comprises a multiple-input and multiple-output series-series feedback amplifier.

17. The receiver for radio transmission with multiple antennas of claim 14, wherein at least one of said multiple-input-port and multiple-output-port amplifiers comprises a multiple-input and multiple-output series-series feedback amplifier comprising a feedback network comprising a plurality of windings, the windings of the feedback network being such that, in the known frequency band, the mutual induction between the different windings has a non-negligible influence on the value of the non-diagonal components of the impedance matrix of the feedback network.

18. The receiver for radio transmission with multiple antennas of claim 14, wherein at least one of said multiple-input-port and multiple-output-port amplifiers comprises a multiple-input and multiple-output series-series feedback amplifier, the p signal input terminals of the multiple-input and multiple-output series-series feedback amplifier being connected to the p signal output terminals of a passive input network having p input ports, the p signal output terminals of the multiple-input and multiple-output series-series feedback amplifier being connected to the p signal input terminals of a passive output network having p output ports, p being a positive integer.

19. The receiver for radio transmission with multiple antennas of claim 14, wherein said multiple-input-port and multiple-output-port amplifiers are such that the voltage gain matrix of each of said multiple-input-port and multiple-output-port amplifiers approximates a specified gain matrix.

20. The receiver for radio transmission with multiple antennas of claim 14, wherein said multiple-input-port and multiple-output-port amplifiers produce a reduced noise spectral density.

* * * * *